US009281011B2

(12) United States Patent
Erofeev et al.

(10) Patent No.: US 9,281,011 B2
(45) Date of Patent: Mar. 8, 2016

(54) SYSTEM AND METHODS FOR ENCODING LIVE MULTIMEDIA CONTENT WITH SYNCHRONIZED AUDIO DATA

(71) Applicant: Sonic IP, Inc., San Diego, CA (US)

(72) Inventors: Kirill Erofeev, Tomsk (RU); Galina Petrova, Tomsk (RU); Dmitry Sahno, Tomsk (RU)

(73) Assignee: Sonic IP, Inc., San Diego, CA (US)

( * ) Notice: Subject to any disclaimer, the term of this patent is extended or adjusted under 35 U.S.C. 154(b) by 550 days.

(21) Appl. No.: 13/629,306

(22) Filed: Sep. 27, 2012

(65) Prior Publication Data

US 2013/0336412 A1    Dec. 19, 2013

Related U.S. Application Data

(60) Provisional application No. 61/659,111, filed on Jun. 13, 2012.

(51) Int. Cl.
*H04N 7/26*        (2006.01)
*G11B 27/031*     (2006.01)
*G11B 27/10*      (2006.01)
*H04N 21/2187*   (2011.01)
*H04N 21/242*    (2011.01)
*H04N 11/04*      (2006.01)
*H04N 7/12*        (2006.01)

(52) U.S. Cl.
CPC .............. *G11B 27/031* (2013.01); *G11B 27/10* (2013.01); *H04N 21/2187* (2013.01); *H04N 21/242* (2013.01)

(58) Field of Classification Search
CPC ......... H04N 7/12; H04N 9/475; H04N 5/228; H04N 21/4307; H04N 5/781; H04B 1/66
See application file for complete search history.

(56) References Cited

U.S. PATENT DOCUMENTS 5,751,280 A * 5/1998 Abbott .............. G06F 17/30017
                                                                 348/E7.071
6,181,383 B1 * 1/2001 Fox .................. H04N 21/23424
                                                                 348/423.1

(Continued)

OTHER PUBLICATIONS

International Preliminary Report on Patentability for International Application PCT/US2013/042105, Report issued Dec. 16, 2014, Mailed Dec. 24, 2014, 8 Pgs.

(Continued)

*Primary Examiner* — Chikaodili E Anyikire
*Assistant Examiner* — Dramos I Kalapodas
(74) *Attorney, Agent, or Firm* — KPPB LLP (57) ABSTRACT

Systems and methods for encoding live multimedia content with audio data synchronized with other streams of data, including video data, in accordance with embodiments of the invention are disclosed. In one embodiment of the invention, an encoding system includes multimedia content storage configured to store live multimedia content including audio data and video data, a processor, and a multimedia encoder, wherein the multimedia encoder configures the processor to receive live multimedia content, generate a timeline using the video data, compute a first time window, align the audio data to the video data using the audio data samples and the timeline, measure a synchronization value of the aligned audio data to the video data using the timeline, realign the audio data to the video data when the synchronization value exceeds a threshold value using the timeline, and multiplex the audio data and video data into a container file.

19 Claims, 4 Drawing Sheets

(56) References Cited

U.S. PATENT DOCUMENTS

| | | | |
|---|---|---|---|
| 6,728,678 B2 * | 4/2004 | Bhadkamkar et al. | 704/270 |
| 6,792,047 B1 * | 9/2004 | Bixby et al. | 375/240.26 |
| 6,801,544 B1 * | 10/2004 | Rijckaert et al. | 370/473 |
| 6,920,181 B1 * | 7/2005 | Porter | 375/240.28 |
| 6,995,311 B2 | 2/2006 | Stevenson | |
| 7,116,894 B1 * | 10/2006 | Chatterton | 386/211 |
| 7,414,550 B1 * | 8/2008 | Sudharsanan | 341/61 |
| 7,624,337 B2 * | 11/2009 | Sull | G06F 17/30796 715/201 |
| 7,991,270 B2 * | 8/2011 | Yahata et al. | 386/248 |
| 8,059,942 B2 * | 11/2011 | Yahata et al. | 386/336 |
| 8,086,087 B2 * | 12/2011 | Kato | 386/201 |
| 8,238,722 B2 * | 8/2012 | Bhadkamkar | G11B 27/10 386/239 |
| 8,548,298 B2 * | 10/2013 | Yahata et al. | 386/214 |
| 8,677,397 B2 * | 3/2014 | Van De Pol | H04H 20/28 725/32 |
| 8,856,371 B2 * | 10/2014 | Kariti | G06Q 10/10 348/14.08 |
| 2002/0003948 A1 | 1/2002 | Himeno et al. | |
| 2002/0150126 A1 * | 10/2002 | Kovacevic | 370/503 |
| 2003/0043924 A1 * | 3/2003 | Haddad et al. | 375/240.28 |
| 2003/0044166 A1 * | 3/2003 | Haddad | H04N 5/76 386/219 |
| 2007/0002946 A1 * | 1/2007 | Bouton | H04N 19/15 375/240.01 |
| 2007/0006063 A1 * | 1/2007 | Jewsbury et al. | 715/500.1 |
| 2007/0208571 A1 | 9/2007 | Lemieux | |
| 2009/0326930 A1 | 12/2009 | Kawashima et al. | |
| 2012/0076209 A1 * | 3/2012 | Matsunaga | H04N 9/8042 375/240.25 |
| 2012/0081567 A1 * | 4/2012 | Cote et al. | H04N 21/41407 348/222.1 |
| 2012/0113270 A1 * | 5/2012 | Spracklen | H04N 17/004 348/194 |
| 2012/0140018 A1 | 6/2012 | Pikin et al. | |
| 2013/0141643 A1 * | 6/2013 | Carson | H04N 21/4307 348/515 |

OTHER PUBLICATIONS

International Search Report and Written Opinion for International Application No. PCT/US13/42105, International Filing Date May 21, 2013, Search Completed Nov. 14, 2013, Mailed Dec. 3, 2013, 9 pgs.

* cited by examiner

FIG. 4

SYSTEM AND METHODS FOR ENCODING LIVE MULTIMEDIA CONTENT WITH SYNCHRONIZED AUDIO DATA

CROSS-REFERENCE TO RELATED APPLICATIONS

This application claims the benefit of U.S. Provisional Patent Application No. 61/659,111, filed on Jun. 13, 2012, the disclosure of which is hereby incorporated by reference in its entirety.

FIELD OF THE INVENTION

The present invention is directed, in general, to systems and methods for encoding multimedia content and more specifically to systems and methods for encoding live multimedia content with synchronized audio data.

BACKGROUND

Streaming video over the Internet has become a phenomenon in modern times. Many popular websites, such as YouTube, a service of Google, Inc. of Mountain View, Calif., and WatchESPN, a service of ESPN of Bristol, Conne., utilize streaming video in order to provide video and television programming to consumers via the Internet.

Video data is often compressed to facilitate the storage and transmission of video data, particularly over networks such as the Internet. A number of video compression standards (codecs) exist, including MPEG2 by the Moving Picture Experts Group (MPEG) of the International Organization for Standardization (ISO) of Geneva, Switzerland, with the International Electrotechnical Commission (IEC) of Geneva, Switzerland, MPEG4 by the ISO/IEC MPEG, and H.264/MPEG4 AVC by the International Telecommunication Union Telecommunication Standardization Sector of Geneva, Switzerland. Video data is compressed, also known as encoded, using an encoder. Encoded video data is decompressed using a decoder corresponding to the encoder used to encode the video data.

Scalable Video Coding (SVC) is an extension of the H.264/MPEG-4 AVC video compression standard, which is specified by the ITU-T H.264 standard by the International Telecommunication Union Telecommunication Standardization Sector of Geneva, Switzerland. SVC enables the encoding of a video bitstream that additionally contains one or more sub-bitstreams. The sub-bitstreams are derived from the video bit-stream by dropping packets of data from the video bit-stream, resulting in a sub-bitstream of lower quality and lower bandwidth than the original video bitstream. SVC supports three forms of scaling a video bitstream into sub-bitstreams: temporal scaling, spatial scaling, and quality scaling. Each of these scaling techniques can be used individually or combined depending on the specific video system.

Pulse Code Modulation (PCM) is a method used to create a digital representation of analog signals, including analog audio data. A PCM stream is a digital representation of an analog signal where the magnitude of the analog signal is sampled at uniform intervals, known as the sample rate, and quantized to a value within a range of digital steps. PCM streams are commonly created using analog to digital converters, and are decoded using digital to analog converters. Systems and methods for performing pulse code modulation of analog signals are described in U.S. Pat. No. 2,801,281, entitled "Communication System Employing Pulse Code Modulation" to Oliver et al., dated Jul. 30, 1957, the entirety of which is incorporated by reference.

A variety of multimedia containers may be used to store encoded multimedia content, including the Matroska container. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

In adaptive streaming systems, multimedia content is typically stored on a media server as a top level index file pointing to a number of alternate streams that contain the actual video and audio data. Each stream is typically stored in one or more container files. A variety of container files, including the Matroska container, may be utilized in adaptive streaming systems.

SUMMARY OF THE INVENTION

Systems and methods for encoding live multimedia content with audio data synchronized with other streams of data within the multimedia content, including video data in accordance with embodiments of the invention are disclosed. In one embodiment of the invention, an encoding system includes live multimedia content storage configured to store live multimedia content, where the live multimedia content includes audio data and video data, where the audio data includes a plurality of audio data samples having an audio data sample duration and the video data includes a plurality of video frames, a processor, and a multimedia encoder, wherein the multimedia encoder configures the processor to receive live multimedia content, generate a timeline using the video data, where the timeline contains a plurality of timestamps, where at least one timestamp in the plurality of timestamps is determined using at least one video frame in the plurality of video frames, compute a first time window, where the first time window includes a first time window duration corresponding to the difference in time between a first timestamp in the timeline and a second timestamp in the timeline, align the audio data to the video data using the audio data samples and the timeline by assigning at least one audio data sample to the first time window based upon the number of audio data sample durations that can occur within the first time window duration, measure a synchronization value of the aligned audio data to the video data using the timeline, realign the audio data to the video data when the synchronization value exceeds a threshold value using the timeline, and multiplex the audio data and video data into a container file.

In another embodiment of the invention, the audio data is aligned to the video data with no gaps or overlays.

In an additional embodiment of the invention, the audio data sample duration is a fixed duration.

In yet another additional embodiment of the invention, the audio data sample duration is a variable duration.

In still another additional embodiment of the invention, the synchronization value is measured by subtracting the duration of the at least one audio data sample from the first time window duration.

In yet still another additional embodiment of the invention, the threshold value is pre-determined.

In yet another embodiment of the invention, the threshold value is determined dynamically.

In still another embodiment of the invention, the audio data is realigned by moving at least one audio data sample assigned to the first time window to a second time window.

In yet still another embodiment of the invention, at least one video frame in the plurality of video frames includes a video frame timestamp and at least one timestamp in the plurality of timestamps is determined using the video frame timestamp.

In yet another additional embodiment of the invention, at least one video frame in the plurality of video frames includes a video frame duration and at least one timestamp in the timeline is determined using the video frame duration.

Still another embodiment of the invention includes a method for encoding live multimedia content including receiving live multimedia content using an encoding system, where the live multimedia content includes audio data and video data, the audio data includes a plurality of audio data samples having an audio data sample duration, and the video data includes a plurality of video frames, generating a timeline using the video data and the encoding system, where the timeline contains a plurality of timestamps, where at least one timestamp in the plurality of timestamps is determined using at least one video frame in the plurality of video frames, computing a first time window using the encoding system, where the first time window includes a first time window duration corresponding to the difference in time between a first timestamp in the timeline and a second timestamp in the timeline, aligning the audio data to the video data using the encoding system, the audio data samples and the timeline by assigning at least one audio data sample to the first time window based upon the number of audio data sample durations that can occur within the first time window duration, measuring a synchronization value of the aligned audio data to the video data using the timeline and the encoding system, realigning the audio data to the video data when the synchronization value exceeds a threshold value using the timeline and the encoding system, and multiplexing the audio data and video data into a container file using the encoding system.

In yet another additional embodiment of the invention, the audio data is aligned to the video data with no gaps or overlays.

In still another additional embodiment of the invention, the audio data sample duration is a fixed duration.

In yet still another additional embodiment of the invention, the audio data sample duration is a variable duration.

In yet another embodiment of the invention, measuring the synchronization value includes subtracting the duration of the at least one audio data sample from the first time window duration using the encoding system.

In still another embodiment of the invention, the threshold value is pre-determined.

In yet still another embodiment of the invention, the threshold value is determined dynamically.

In yet another additional embodiment of the invention, realigning the audio data includes moving at least one audio data sample assigned to the first time window to a second time window using the encoding system.

In still another additional embodiment of the invention, at least one video frame in the plurality of video frames includes a video frame timestamp and determining at least one timestamp in the plurality of timestamps utilizes the video frame timestamp and the encoding system.

In yet still another additional embodiment of the invention, at least one video frame in the plurality of video frames includes a video frame duration and determining at least one timestamp in the timeline utilizes the video frame duration and the encoding system.

Yet another embodiment of the invention includes a machine readable medium containing processor instructions, where execution of the instructions by a processor causes the processor to perform a process including receiving live multimedia content, where the live multimedia content includes audio data and video data, the audio data includes a plurality of audio data samples having an audio data sample duration, and the video data includes a plurality of video frames, generating a timeline using the video data, where the timeline contains a plurality of timestamps, where at least one timestamp in the plurality of timestamps is determined using at least one video frame in the plurality of video frames, computing a first time window, where the first time window includes a first time window duration corresponding to the difference in time between a first timestamp in the timeline and a second timestamp in the timeline, aligning the audio data to the video data, the audio data samples and the timeline by assigning at least one audio data sample to the first time window based upon the number of audio data sample durations that can occur within the first time window duration, measuring a synchronization value of the aligned audio data to the video data using the timeline, realigning the audio data to the video data when the synchronization value exceeds a threshold value using the timeline, and multiplexing the audio data and video data into a container file using the encoding system.

DETAILED DESCRIPTION

Turning now to the drawings, systems and methods for encoding live multimedia content with synchronized audio data in accordance with embodiments of the invention are disclosed. Multimedia content typically includes audio data and video data. In many embodiments, video data is encoded using one of a variety of video compression schemes and the audio data is encoded using pulse code modulation (PCM). The audio data can then be multiplexed with the frames of encoded video data and stored in a container file. When encoding live multimedia content, such as for use in live streaming over the Internet, the audio data is synchronized quickly in order to facilitate the encoding and delivery of the live multimedia content.

Container files are composed of blocks of content (e.g. fragments, elements, or chunks), where each block of content includes audio data and/or video data. A number of container files have restrictions as to how timestamps are applied to the data stored in the container file and/or the container files may have blocks of content of a fixed size. Furthermore, the generation of timestamps for live sources of audio and video data may contain errors or other issues. For example, the difference between adjacent timestamps present in the audio data may not be equal to the actual duration of the audio data contained between the adjacent timestamps. These restrictions and errors can cause the audio and video data to become desynchronized when the audio and video data is multiplexed in a container file.

In many embodiments, the likelihood of desynchronization is reduced by construction of a timeline using the timestamps of the encoded video data and synchronizing the audio data to the video data based upon the sampling rate of the audio data. In a number of embodiments, the audio data is synchronized to the timeline by adjusting the number of PCM samples assigned to a particular time interval. In several embodiments, the container file format permits a specific number of audio samples in each frame interval and the audio data is synchronized to the timeline by resampling the audio data to obtain an appropriate number of samples. The audio data and video data can then be multiplexed into a container file. Systems and methods for encoding live multimedia content with synchronized audio data in accordance with embodiments of the invention are discussed further below.

System Overview

Figure 1:
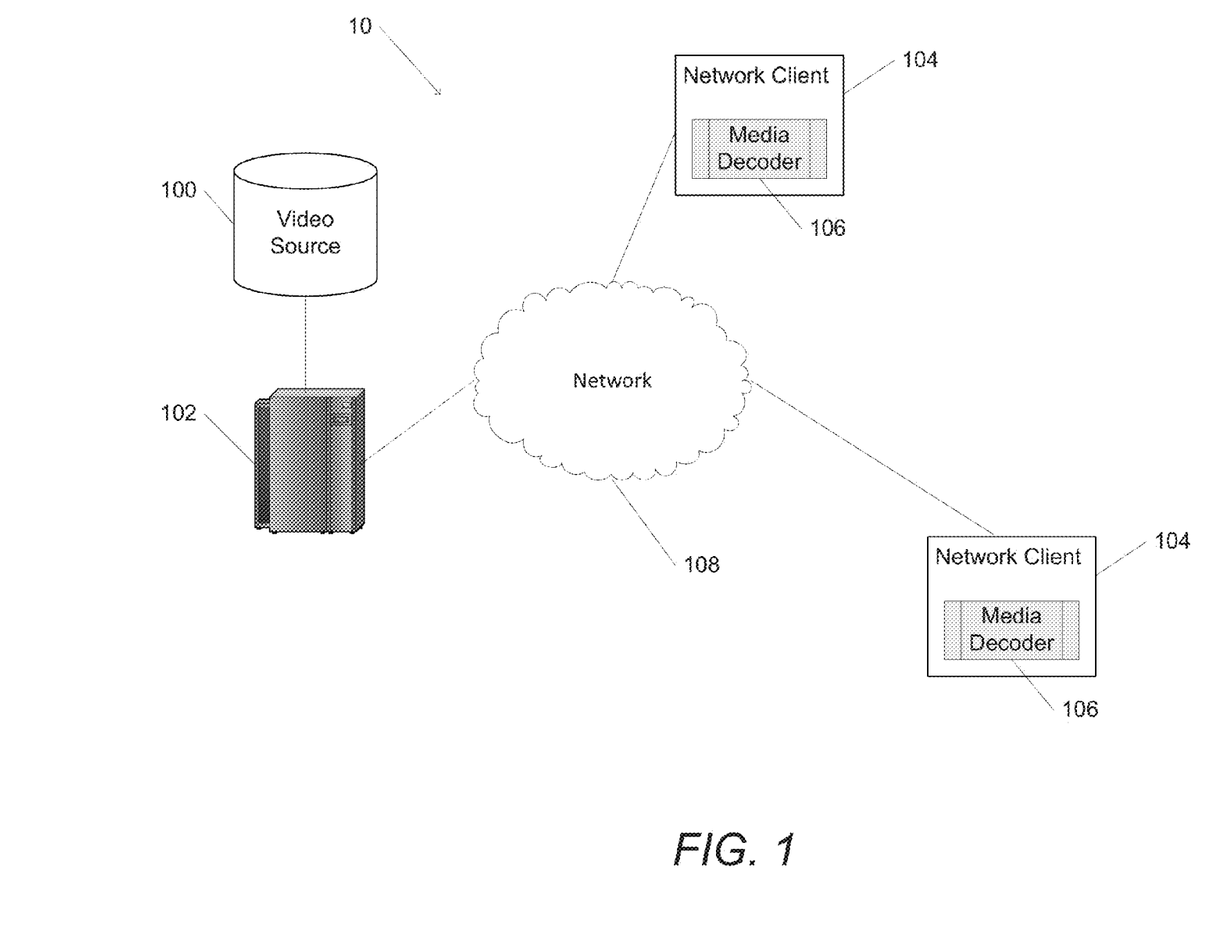
FIG. 1 is a system diagram of a system for encoding and delivering live multimedia content in accordance with an embodiment of the invention.

Media servers in accordance with embodiments of the invention are configured to encode live multimedia content to be stored and/or streamed to network clients. A media streaming network including a media server configured to encode live multimedia content in accordance with an embodiment of the invention is illustrated in FIG. 1. The illustrated media streaming network 10 includes a media source 100 configured to encode multimedia content in real time. The media source 100 is configured to capture and/or receive streams of live audio data from an audio source and streams of live video data from a video source. In accordance with embodiments of the invention, the audio source and video source generate and apply a timestamp to their respective captured data. However, the timestamps applied by the audio source and video source are likely to not be synchronized with each other and cannot be relied upon by the video source 100 to synchronize the encoded audio data and the encoded video data. In a number of embodiments of the invention, the media source 100 contains pre-encoded multimedia content. The media source 100 is connected to a network renderer 102. In accordance with embodiments of the invention, the network renderer 102 synchronizes the encoded audio data the encoded video data by using the encoded video data to create a timeline and synchronizing the encoded audio data to the timeline based upon the sampling rate of the encoded audio data. In several embodiments, the initial synchronization of the video data and the audio data may be obtained using an initial synchronization sequence. In many embodiments, the media source 100 and the network renderer 102 are implemented using a media server. In accordance with embodiments of the invention, the network renderer 102 is connected to a plurality of network clients 104 utilizing a network 108.

In many embodiments of the invention, the network renderer 102 is implemented using a single machine. In several embodiments of the invention, the network renderer 102 is implemented using a plurality of machines. In many embodiments, the network 108 is the Internet. In several embodiments, the network 108 is any IP network.

The network clients 104 contain a media decoder 106. In several embodiments of the invention, the network client 104 is configured to receive and decode received multimedia content using the media decoder 106.

Figure 2:
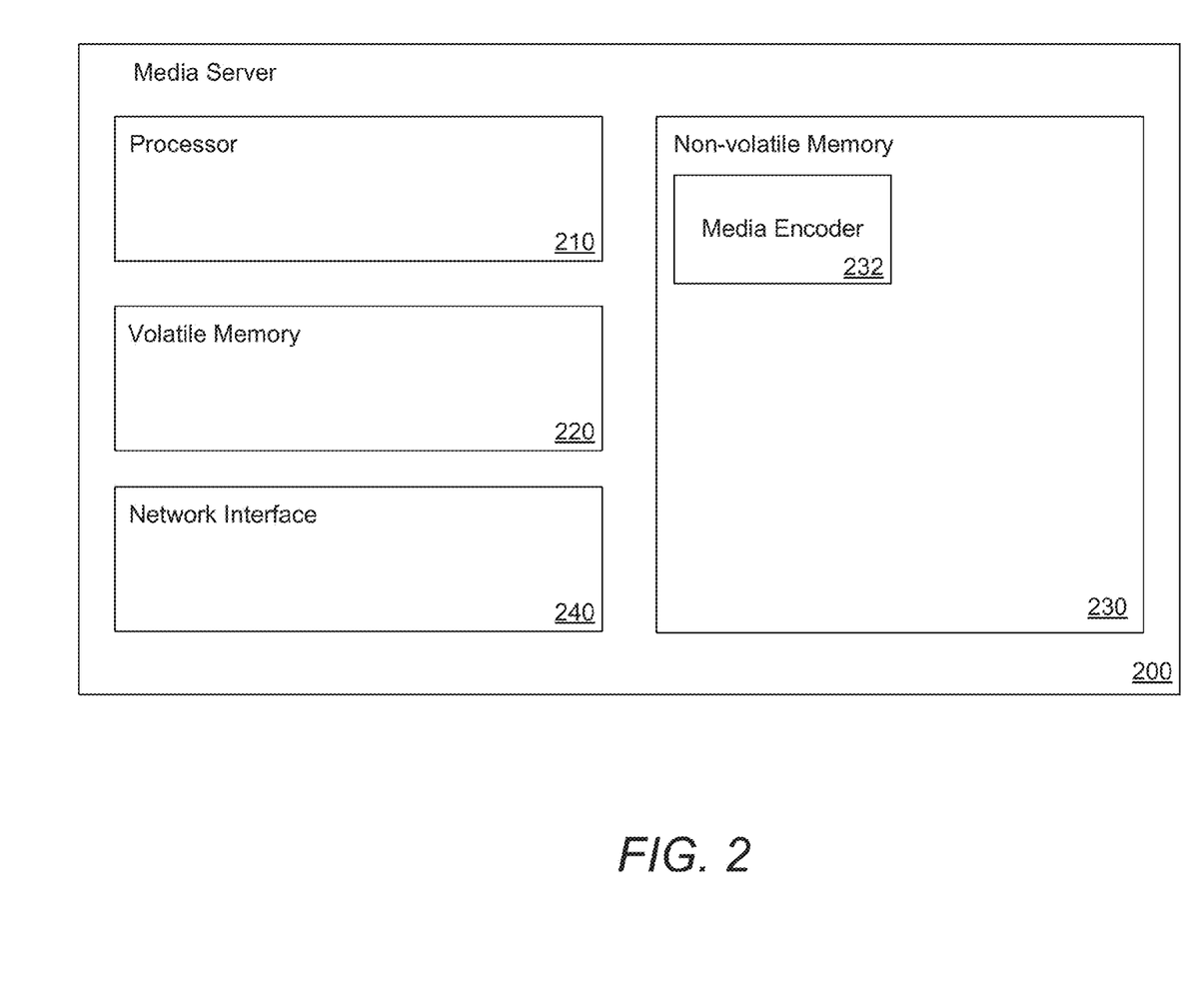
FIG. 2 conceptually illustrates a media server configured to encode live video data with synchronized audio data in accordance with an embodiment of the invention.

In many embodiments of the invention, a media server, where the media server includes a media source 100 and a network renderer 102, is implemented using a machine capable of receiving live multimedia content and multiplexing the received live multimedia content into a container file. In accordance with embodiments of the invention, the media server is also capable of encoding the received live multimedia content. The basic architecture of a media server in accordance with an embodiment of the invention is illustrated in FIG. 2. The media server 200 includes a processor 210 in communication with non-volatile memory 230, volatile memory 220, and a network interface 240. In the illustrated embodiment, the non-volatile memory includes a media encoder 232 that configures the processor to encode live multimedia content by creating a timeline using the video data in the live multimedia content, synchronizing samples of the audio data with the video data using the timeline, and multiplexing the audio data and video data in a container file. In many embodiments, the container file contains blocks of content with a fixed number of audio samples; in accordance with embodiments of the invention, the audio data is resampled to obtain the appropriate number of audio samples prior to multiplexing the audio data and the video data in a container file. In several embodiments, the network interface 240 may be in communication with the processor 210, the volatile memory 220, and/or the non-volatile memory 230. Although a specific media server architecture is illustrated in FIG. 2, any of a variety of architectures including architectures where the media encoder 232 is located on disk or some other form of storage and is loaded into volatile memory 220 at runtime can be utilized to implement media servers in accordance with embodiments of the invention.

Although specific architectures for a media streaming network and a media server configured to encode live multimedia content are described above with respect to FIGS. 1 and 2, other implementations appropriate to a specific application can be utilized in accordance with embodiments of the invention. Methods for encoding live multimedia content with synchronized audio data in accordance with embodiments of the invention are discussed below.

Encoding Live Multimedia Content with Synchronized Audio Data

Live multimedia content can be encoded for a variety of purposes including, but not limited to, streaming the live multimedia content to a number of network clients. In order to provide a high quality viewing experience, the video data and the audio data should be closely synchronized so that the encoded multimedia content provides an experience similar to viewing the content live. In this way, the audio will correspond with relevant visual cues such as (but not limited to) lip motion associated with a person talking or singing. Traditionally, this synchronization is performed using the timestamps associated with the audio data and the video data; these timestamps are created by the hardware and/or software capturing the audio data and video data. However, the timestamps generated during the capture of the audio data and the video data may not be aligned and/or differences in the hardware and/or software may result in timestamps generated by the hardware recording the audio data and the hardware recording the video data being inconsistent with each other over the course of the recording of the live multimedia content. Further compounding the problem, the timestamps generated when recording the live audio data and video data may not accurately represent the real world elapsed time between the recorded timestamps. Moreover, direct multiplexing of the audio data and the video data may result in the loss of timestamps captured by the recording hardware, potentially causing synchronization problems as additional live multimedia content is encoded. However, these issues may be minimized, or even avoided, by constructing a new timeline using the video data and synchronizing the audio data using the timeline based upon the sampling rate of the audio data in accordance with embodiments of the invention.

Figure 3:
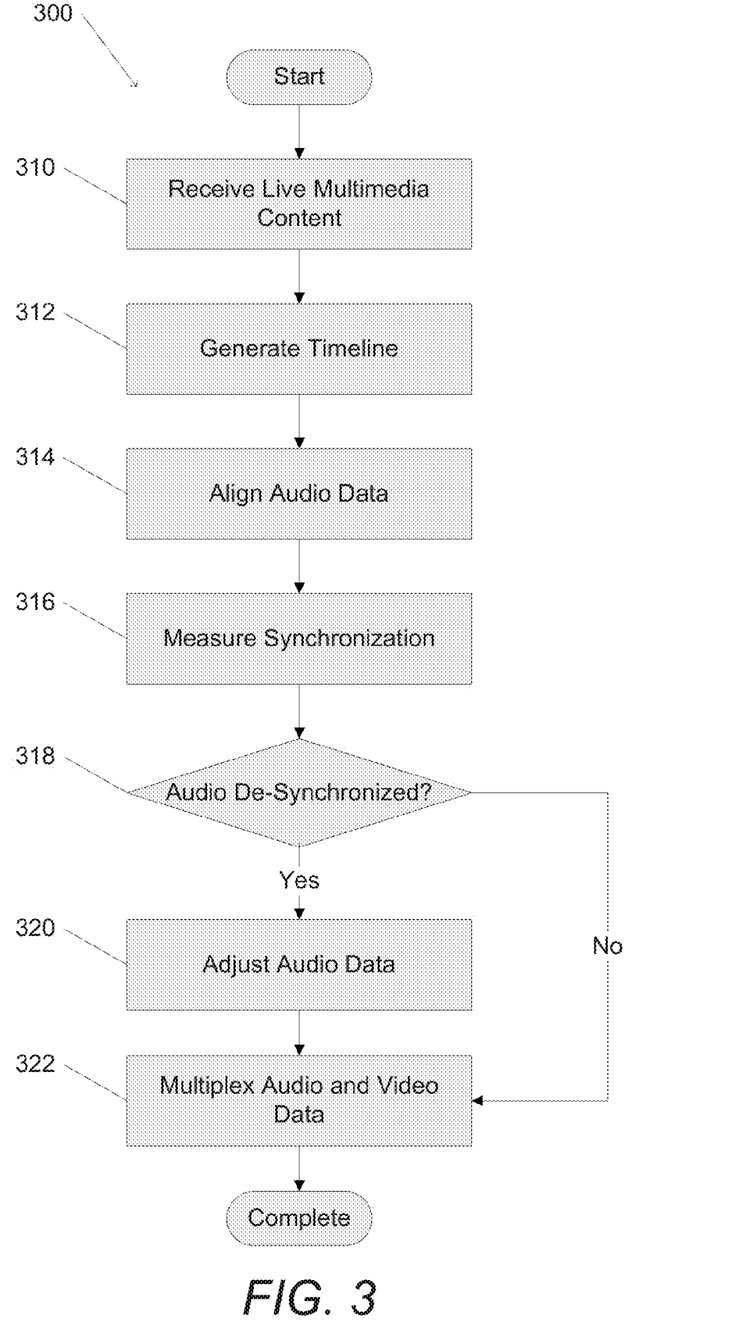
FIG. 3 is a flow chart illustrating a process for encoding live multimedia content with audio data synchronized with video data in accordance with an embodiment of the invention.

A process for encoding live multimedia content in which audio data is synchronized with encoded video data is illustrated in FIG. 3. The process 300 includes receiving (310) live multimedia content, where the multimedia content includes (but is not limited to) audio data and video data. A timeline containing one or more timestamps is generated (312) using the timestamps associated with the frames of video data and/or the known frame rate of the video data. The audio data is aligned (314) to the video data using the timeline. The synchronization of the audio data is measured (316) using a synchronization threshold. If the audio data is de-synchronized (318) beyond the synchronization threshold, the audio data is adjusted (320). The synchronized audio data and video data are multiplexed (322) into a container file.

In several embodiments, the video data is encoded in accordance with video encoding standards including (but not limited to) MPEG2, MPEG4, H.264, or Scalable Video Coding. In a number of embodiments, the audio data is encoded using PCM. In many embodiments, the audio data is aligned (314) to the video data using the timeline by assigning fragments of PCM samples to the timeline without any gaps or overlays. In a number of embodiments, PCM samples have a fixed duration and the audio data is aligned (314) to the timestamps by assigning enough PCM samples so that the duration fills the difference between the current timestamp and the adjacent timestamp in the timeline. In many embodiments, the difference between the current timestamp and the adjacent timestamp in the timeline is a time window; the time window has a duration which is the difference between the timestamps. In several embodiments, the synchronization of the PCM samples is measured (316) at each timestamp in the timeline using a variety of methods, including, but not limited to, subtracting the total length of the PCM samples from the difference in time between the timestamp and the adjacent timestamp. In many embodiments, the audio data and video data are multiplexed (322) into a container file that includes a block of content (e.g. a fragment, element, or chunk) that stores one or more frames of video data and the audio data played back during the display of the one or more frames of video data. These predetermined portions can have a variable size depending on the data stored in the block of content. In accordance with embodiments of the invention, a timestamp can be associated with the predetermined portions of the container file containing video frames and associated audio data and the timestamps can be utilized by decoders to time the display of individual frames of video and the playback of the accompanying audio.

In many embodiments, if the measured (316) synchronization of the audio data exceeds (318) the synchronization threshold, the audio data is adjusted (320) by moving PCM samples from one timestamp to the next. For example, if the measured (316) synchronization indicates that the audio data is falling behind the video data at timestamp X, the audio data is adjusted (320) by pulling PCM samples of audio data from the block of content in the container file associated with adjacent timestamp X+1. Likewise, if the audio data is ahead of the video data, the audio data is adjusted (320) by pushing PCM samples of audio data from the portion of the container file associated with timestamp X to the block of content associated with adjacent timestamp X+1. Other adjustments may be utilized in accordance with embodiments of the invention.

A specific process for encoding live media with audio data synchronized to the video data in accordance with embodiments of the invention is described above with respect to FIG. 3; however, a variety of processes may be utilized in accordance with embodiments of the invention. Methods for encoding live media with synchronized audio using containers with fixed size blocks of content in accordance with embodiments of the invention are discussed below.

Encoding Live Multimedia Content with Resampled Audio Data

As noted above, creating a timeline using video data and using that timeline to synchronize audio data to the video data enables the encoding of live multimedia content which will provide a high quality viewing experience. However, a number of container file formats utilized in accordance with embodiments of the invention fix the size of the predetermined portions that contain one or more frames of video data and the audio data that accompanies the one or more frames of video. Fixing the size of each predetermined portion utilized to store video and/or audio data typically means that each of the predetermined portions contains the same number of audio samples. Depending upon the sampling rate of the audio relative to the frame rate of the video, a different number of samples may fall within each frame interval. In a number of embodiments of the invention, the audio samples are resampled to obtain the appropriate number of samples. In several embodiments, filters and/or other appropriate adjustments can be applied to the samples to minimize the audio distortion resulting from playback of the resampled audio.

Figure 4:
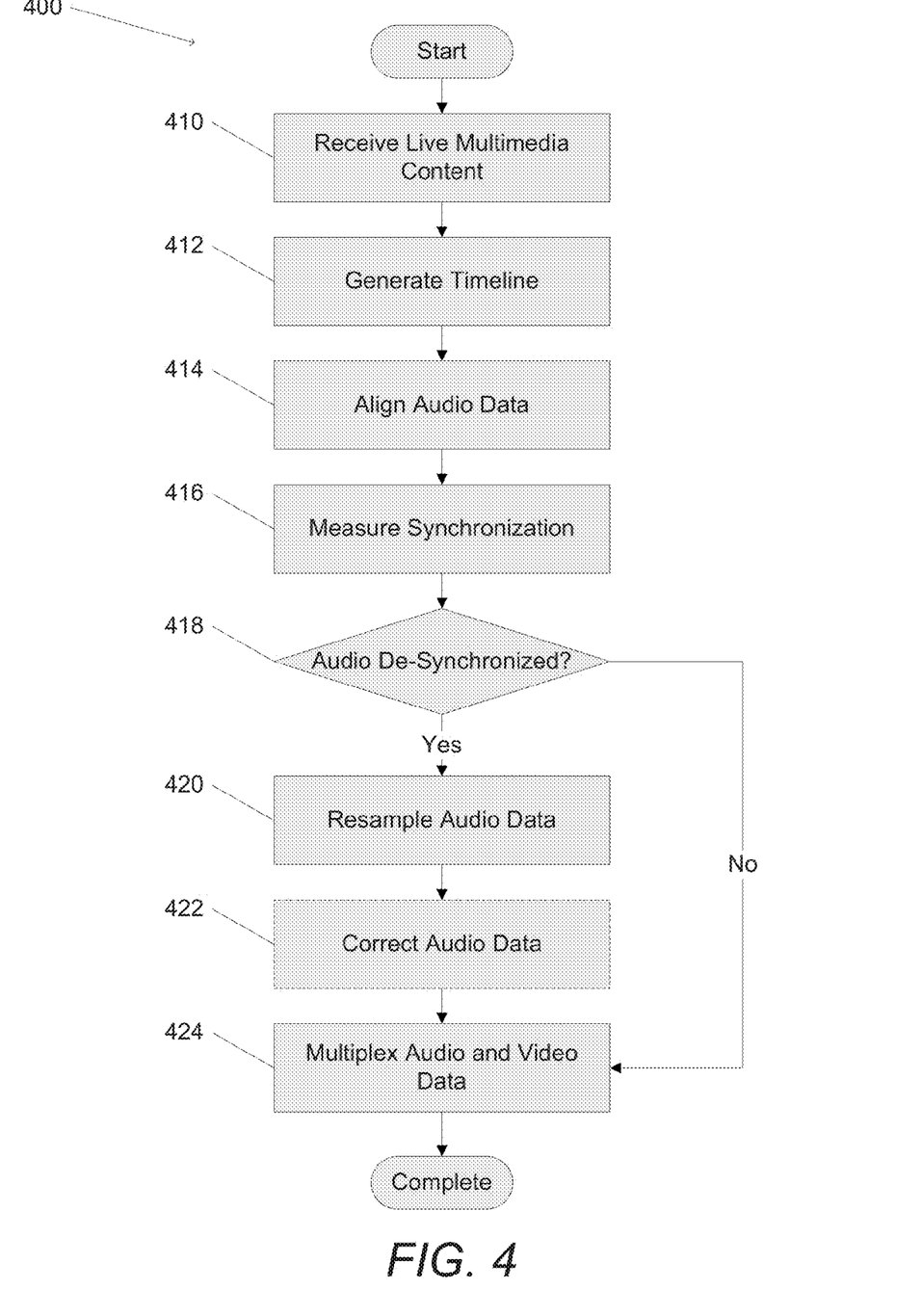
FIG. 4 is a flow chart illustrating a process for encoding live multimedia content with resampled audio data synchronized with video data in accordance with an embodiment of the invention.

A process for encoding live multimedia content in which audio data is synchronized with video data and multiplexing the audio and video data into a container file have a fixed number of audio samples per frame interval is illustrated in FIG. 4. The process 400 includes receiving (410) live multimedia content, where the multimedia content includes, but is not limited to, audio data and video data. A timeline containing one or more timestamps is generated (412) using the video data. The audio data is aligned (414) to the video data using the timeline. The synchronization of the audio data is measured (416) using a synchronization threshold. If the audio data is desynchronized (418) beyond the synchronization threshold, the audio data is resampled (420), and, if necessary, corrections are applied (422) to the resampled audio data. The audio data and video data are multiplexed (424) into the container file.

In accordance with embodiments of the invention, a process similar to the one described above with respect to FIG. 3 may be utilized for building a timeline and detecting audio de-synchronization (410)-(418). In several embodiments, the synchronization threshold is measured (416) by counting the number of samples of audio data assigned to a timestamp in the timeline and comparing that number to the number of audio samples allowed for a block of content in the container file. If the number of samples of audio data differs from the number of audio samples allowed for the block of content, the audio data is resampled (420). In a number of embodiments, resampling (420) the PCM samples contained in the audio data results in the resampled audio data having a sample rate that is higher or lower than the original sample rate. In several embodiments, the difference between the resampled sample rate and the original sample rate is kept within a threshold value, such as (but not limited to) 500 Hz. In many embodiments, the resampled audio data is corrected (422) using one or more of a variety of techniques, including, but not limited to, pitch compensation, in order to mask changes in the sound resulting from the resampling process.

A specific process for encoding live media with synchronized audio using containers with fixed size blocks of content is described above with respect to FIG. 4; however, a variety of processes may be utilized in accordance with embodiments of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An encoding system, comprising:
    live multimedia content storage configured to store live multimedia content, where the live multimedia content comprises audio data and video data, where the audio data comprises a plurality of audio data samples where each of the plurality of audio samples has an audio data sample duration and the video data comprises a plurality of video frames;
    a processor; and
    a multimedia encoder;
    wherein the multimedia encoder directs the processor to:
        receive live multimedia content;
        generate a timeline using the video data of the received live multimedia content, where the timeline contains a plurality of timestamps, where at least one timestamp in the plurality of timestamps is determined using at least one video frame in the plurality of video frames in the video data of the live media content;
        compute a first time window having a duration corresponding to the difference in time between a first one of the plurality of timestamps in the timeline and a second one of the plurality of timestamps in the timeline;
        align audio data of the received live multimedia content to the video data of the received live multimedia content using a plurality of audio data samples of the received live multimedia content and the timeline by assigning a number of the plurality of audio data samples to the first time window based upon a number of the plurality of audio data samples that can occur within the first time window based upon the audio data sample durations of each of the plurality of audio data samples in the received live multimedia content and the duration of the first time window;
        measure a synchronization value of the aligned audio data to the video data using the timeline wherein the synchronization value is measured by subtracting the audio data sample duration of the at least one of the plurality of audio data samples from the duration of the first window;
        realign the audio data to the video data when the synchronization value exceeds a threshold value using the timeline; and
        multiplex the audio data and video data into a container file.

2. The encoding system of claim 1, wherein the audio data is aligned to the video data with no gaps or overlays.

3. The encoding system of claim 1, wherein the audio data sample duration is a fixed duration.

4. The encoding system of claim 1, wherein the audio data sample duration is a variable duration.

5. The encoding system of claim 1, wherein the threshold value is pre-determined.

6. The encoding system of claim 1, wherein the threshold value is determined dynamically.

7. The encoding system of claim 1, wherein the audio data is realigned by moving at least one of the plurality of audio data samples assigned to the first time window to a second time window.

8. The encoding system of claim 1, wherein:
    at least one video frame in the plurality of video frames comprises a video frame timestamp; and
    at least one timestamp in the plurality of timestamps of the timeline is determined using the video frame timestamp.

9. The encoding system of claim 1, wherein:
    at least one video frame in the plurality of video frames comprises a video frame duration; and
    at least one timestamp in the plurality of timestamps of the timeline is determined using the video frame duration.

10. A method for encoding live multimedia content, comprising:
    receiving live multimedia content using an encoding system, where the live multimedia content comprises audio data and video data, the audio data comprises a plurality of audio data samples wherein each of the plurality of audio data samples has an audio data sample duration, and the video data comprises a plurality of video frames;
    generating a timeline using the video data of the received live multimedia content and the encoding system, where the timeline contains a plurality of timestamps, where at least one timestamp in the plurality of timestamps is determined using at least one video frame in the plurality of video frames from the video data of the received live multimedia content;
    computing a first time window using the encoding system having a duration corresponding to the difference in time between a first timestamp in the timeline and a second timestamp in the timeline;
    aligning the audio data of the received live multimedia content to the video data of the received live multimedia content using the encoding system, the plurality of audio data samples from the audio data of the received live multimedia content and the timeline by assigning a number of the plurality of audio data samples to the first time window based upon the audio data sample durations of each of the plurality of audio data samples in the received live multimedia content and the duration of the first time window;
    measuring a synchronization value of the aligned audio data to the video data using the timeline and the encoding system wherein the synchronization value is measured by subtracting the audio data sample duration of the at least one of the plurality of audio data samples from the duration of the first window;
    realigning the audio data to the video data when the synchronization value exceeds a threshold value using the timeline and the encoding system; and
    multiplexing the audio data and video data into a container file using the encoding system.

11. The method of claim 10, wherein the audio data is aligned to the video data with no gaps or overlays.

12. The method of claim 10, wherein the audio data sample duration is a fixed duration.

13. The method of claim 10, wherein the audio data sample duration is a variable duration.

14. The method of claim 10, wherein the threshold value is pre-determined.

15. The method of claim 10, wherein the threshold value is determined dynamically.

16. The method of claim 10, wherein realigning the audio data comprises moving at least one audio data sample assigned to the first time window to a second time window using the encoding system.

17. The method of claim 10, wherein:
at least one video frame in the plurality of video frames comprises a video frame timestamp; and
determining at least one timestamp in the plurality of timestamps of the timeline utilizes the video frame timestamp and the encoding system.

18. The method of claim 10, wherein:
at least one video frame in the plurality of video frames comprises a video frame duration; and
determining at least one timestamp in the plurality of timestamps of the timeline utilizes the video frame duration and the encoding system.

19. A non-transitory machine readable medium containing processor instructions, where execution of the instructions by a processor causes the processor to perform a process comprising:
receiving live multimedia content, where the live multimedia content comprises audio data and video data, the audio data comprises a plurality of audio data samples wherein each of the plurality of audio data samples has an audio data sample duration, and the video data comprises a plurality of video frames;
generating a timeline using the video data of the received live multimedia content, where the timeline contains a plurality of timestamps, where at least one timestamp in the plurality of timestamps is determined using at least one video frame in the plurality of video frames from the video data of the received live multimedia content;
computing a first time window, where the first time window duration corresponding to the difference in time between a first timestamp in the timeline and a second timestamp in the timeline;
aligning the audio data of the received live multimedia content to the video data of the received live multimedia content using the plurality of audio data samples from the audio data of the received live multimedia content and the timeline by assigning a number of the plurality of audio data samples to the first time window based upon the audio data sample durations of each of the plurality of audio data samples in the received live multimedia content and the duration of the first time window;
measuring a synchronization value of the aligned audio data to the video data using the timeline wherein the synchronization value is measured by subtracting the audio data sample duration of the at least one of the plurality of audio data samples from the duration of the first window;
realigning the audio data to the video data when the synchronization value exceeds a threshold value using the timeline; and
multiplexing the audio data and video data into a container file using the encoding system.

* * * * *